(12) United States Patent
Mak et al.

(10) Patent No.: US 9,845,038 B2
(45) Date of Patent: Dec. 19, 2017

(54) VEHICLE AFFIXABLE FOOD HOLDER AND CLIP

(71) Applicants: Kenneth S. Mak, San Francisco, CA (US); Elia Song Mak, San Francisco, CA (US)

(72) Inventors: Kenneth S. Mak, San Francisco, CA (US); Elia Song Mak, San Francisco, CA (US)

(*) Notice: Subject to any disclaimer, the term of this patent is extended or adjusted under 35 U.S.C. 154(b) by 0 days.

(21) Appl. No.: 13/960,550

(22) Filed: Aug. 6, 2013

(65) Prior Publication Data

US 2014/0034697 A1 Feb. 6, 2014

Related U.S. Application Data

(60) Provisional application No. 61/679,979, filed on Aug. 6, 2012.

(51) Int. Cl.
*B60N 3/10* (2006.01)
*B60R 7/06* (2006.01)

(52) U.S. Cl.
CPC ..................... *B60N 3/103* (2013.01)

(58) Field of Classification Search
CPC ............... B60N 3/10; B60R 7/06; B60R 2011/0005–2011/0008
USPC .... 224/483, 281, 282, 926; 3/483, 281, 282, 3/926
See application file for complete search history.

(56) References Cited

U.S. PATENT DOCUMENTS

| | | | | |
|---|---|---|---|---|
| 1,902,978 A | * | 3/1933 | Von Frankenberg | ... A24F 15/18 206/250 |
| 3,842,981 A | * | 10/1974 | Lambert | ................ A47G 29/08 211/74 |
| 4,071,175 A | * | 1/1978 | Wagnon | ........................ 224/414 |
| 4,088,250 A | * | 5/1978 | Schaefer | .................. A45F 3/16 215/395 |
| 4,653,289 A | * | 3/1987 | Hodgetts | ................ B60N 3/104 62/239 |
| 4,852,843 A | * | 8/1989 | Chandler | ................... 248/311.2 |
| 4,892,138 A | * | 1/1990 | Bibik, Jr. | ............... B60N 3/104 165/41 |
| 4,953,771 A | * | 9/1990 | Fischer et al. | ................ 224/549 |
| 5,092,395 A | * | 3/1992 | Amidzich | ....................... 165/41 |
| 5,165,646 A | * | 11/1992 | Gewecke | ................... 248/311.2 |
| D338,138 S | * | 8/1993 | Miyajima | .................... D12/420 |
| 5,249,702 A | * | 10/1993 | Topp et al. | .................... 220/705 |

(Continued)

FOREIGN PATENT DOCUMENTS

| | | |
|---|---|---|
| JP | 11-129805 | 5/1999 |
| JP | 2002-120630 | 4/2002 |
| JP | 2003-54304 | 2/2003 |

OTHER PUBLICATIONS

International Search Report and Written Opinion dated Nov. 6, 2013 issued in corresponding International Application No. PCT/US2013/053838.

*Primary Examiner* — Brian D Nash
(74) *Attorney, Agent, or Firm* — Onello & Mello, LLP

(57) ABSTRACT

A vehicle food holder or container comprises a cup configured to hold at least one food item or food receptacle and a clip configured to removably attach the food holder to an internal portion of a vehicle. The food holder can have single or multiple food holding compartments, and can be disposable or reusable.

20 Claims, 17 Drawing Sheets

(56) References Cited

U.S. PATENT DOCUMENTS

| | | | | |
|---|---|---|---|---|
| 5,390,887 A * | 2/1995 | Campbell | B60N 3/106 | |
| | | | 224/42.32 | |
| 5,489,055 A * | 2/1996 | Levy | 224/544 | |
| 5,593,124 A * | 1/1997 | Wang | 248/231.81 | |
| 5,961,083 A * | 10/1999 | Hartmann | B60N 3/101 | |
| | | | 248/222.14 | |
| 5,979,724 A * | 11/1999 | Loewenthal et al. | 224/483 | |
| 5,983,662 A * | 11/1999 | Luetsch | F25D 7/00 | |
| | | | 62/315 | |
| 6,036,071 A * | 3/2000 | Hartmann et al. | 224/547 | |
| 6,098,860 A * | 8/2000 | Phillips | 224/483 | |
| 6,113,049 A * | 9/2000 | Miljanich | B60N 3/103 | |
| | | | 248/311.2 | |
| 6,206,260 B1 * | 3/2001 | Covell | B60N 3/083 | |
| | | | 206/5 | |
| 6,264,153 B1 * | 7/2001 | Ragner et al. | 248/311.2 | |
| 6,290,063 B1 * | 9/2001 | Vogt | B60N 3/106 | |
| | | | 206/549 | |
| 6,422,300 B1 * | 7/2002 | Wylin | B60H 1/00271 | |
| | | | 165/41 | |
| 6,520,367 B1 * | 2/2003 | Piroch | A47F 1/06 | |
| | | | 220/4.21 | |
| 6,560,983 B1 * | 5/2003 | Schimmeyer | 62/244 | |
| 6,866,318 B1 * | 3/2005 | Stevenson | 296/37.12 | |
| 7,510,158 B1 * | 3/2009 | Terry | B60N 3/106 | |
| | | | 220/529 | |
| 7,611,114 B1 * | 11/2009 | Griffin | A45F 5/00 | |
| | | | 220/737 | |
| 7,712,718 B2 * | 5/2010 | Schimmeyer | B60N 3/107 | |
| | | | 220/482 | |
| 7,857,178 B2 * | 12/2010 | Brown, Jr. | 224/483 | |
| 8,205,767 B2 * | 6/2012 | Lawlor | B60N 3/106 | |
| | | | 220/737 | |
| 8,322,584 B2 * | 12/2012 | Dethmers | 224/544 | |
| 8,636,319 B1 * | 1/2014 | Parker, Jr. | 297/188.12 | |
| 2003/0052146 A1 * | 3/2003 | Magnuson et al. | 224/483 | |
| 2008/0078793 A1 * | 4/2008 | Brown | 224/483 | |
| 2008/0083857 A1 * | 4/2008 | Kato | B60N 3/107 | |
| | | | 248/149 | |
| 2008/0178623 A1 | 7/2008 | Cunningham | | |
| 2008/0210726 A1 | 9/2008 | Josephs | | |

* cited by examiner

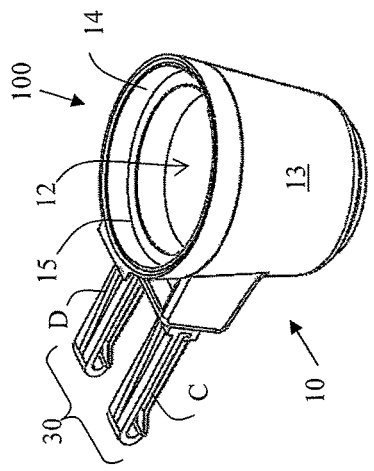
FIG. 1
FIG. 2
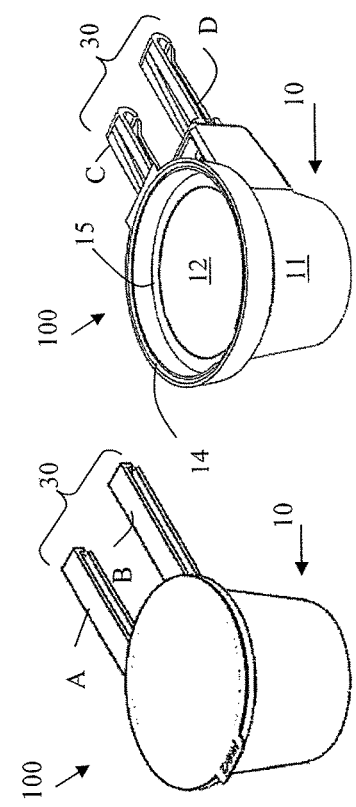
FIG. 3
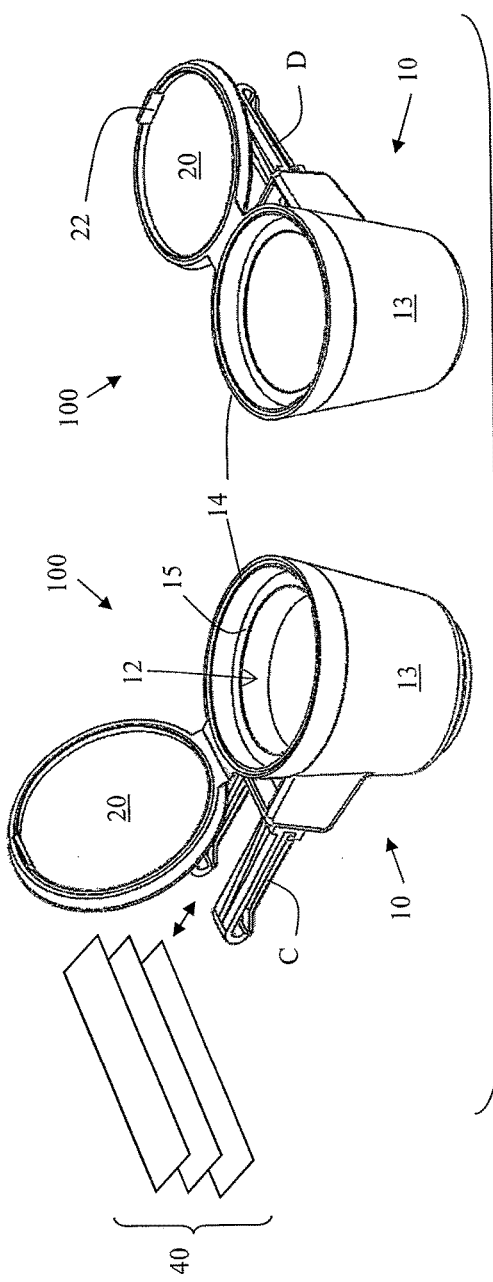
FIG. 4

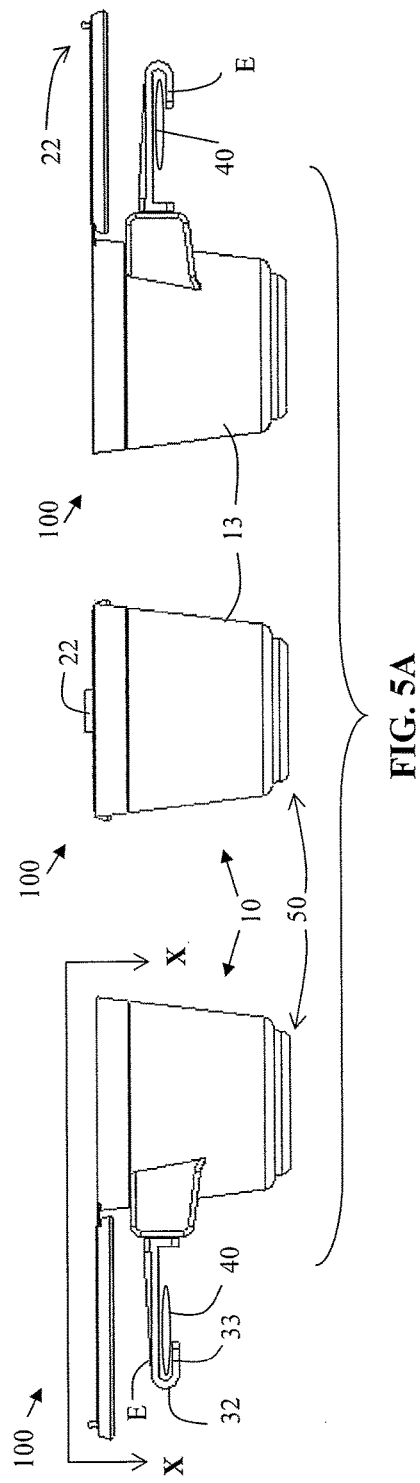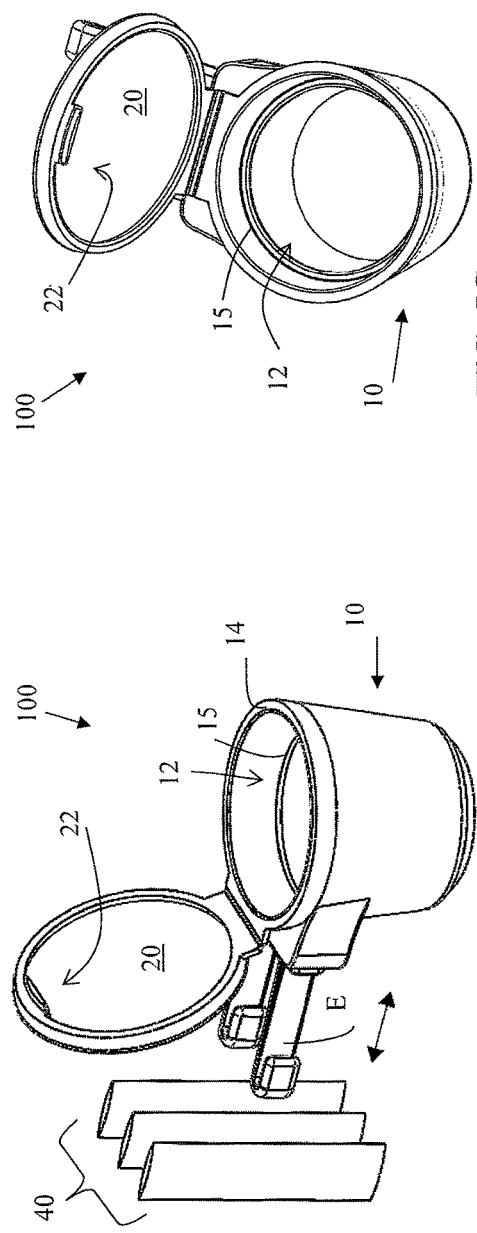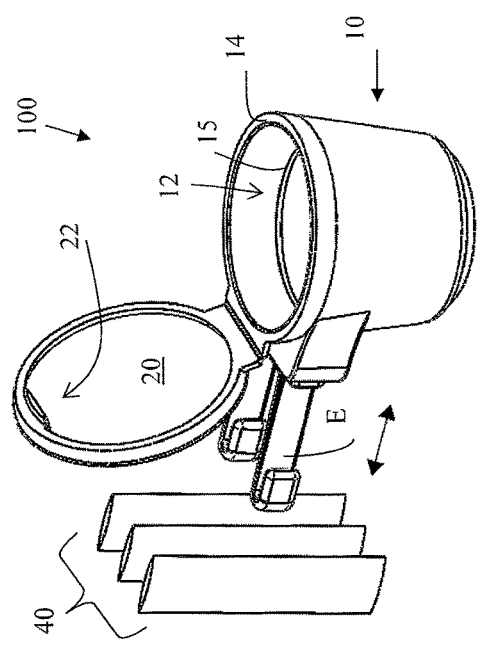

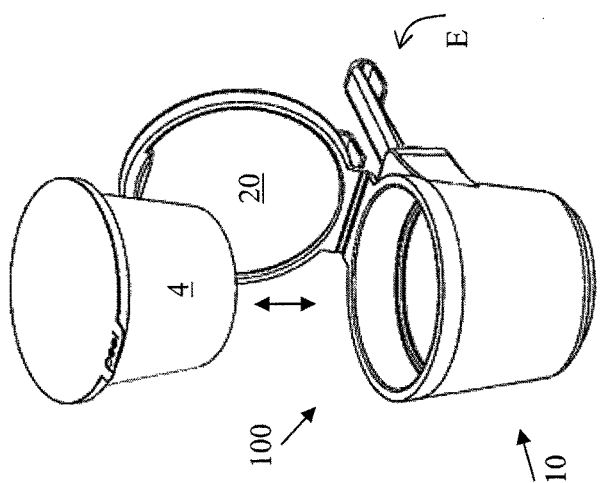
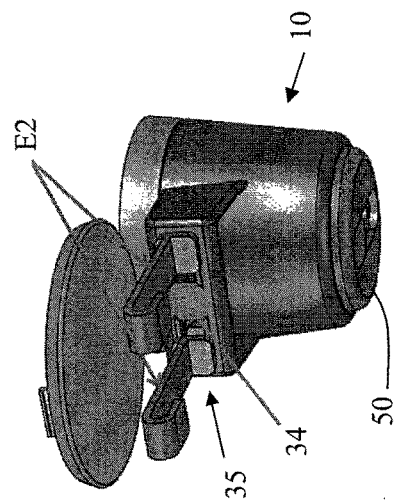
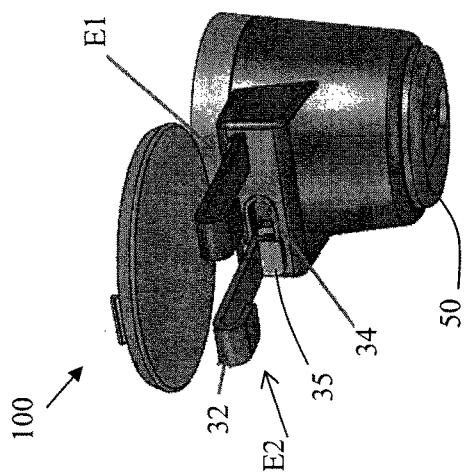
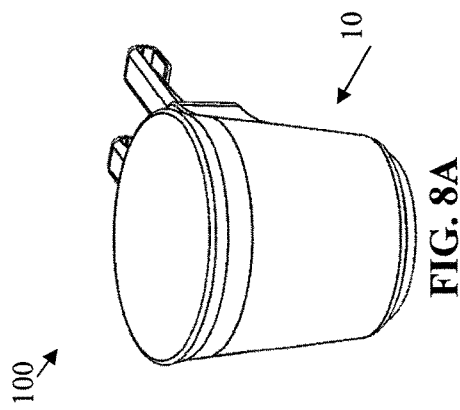

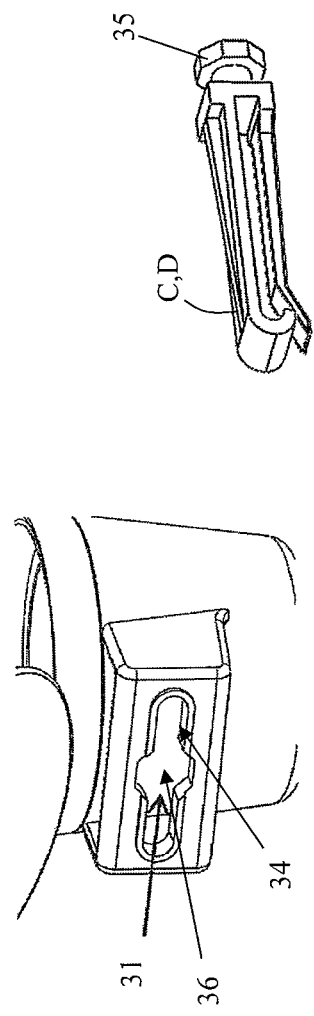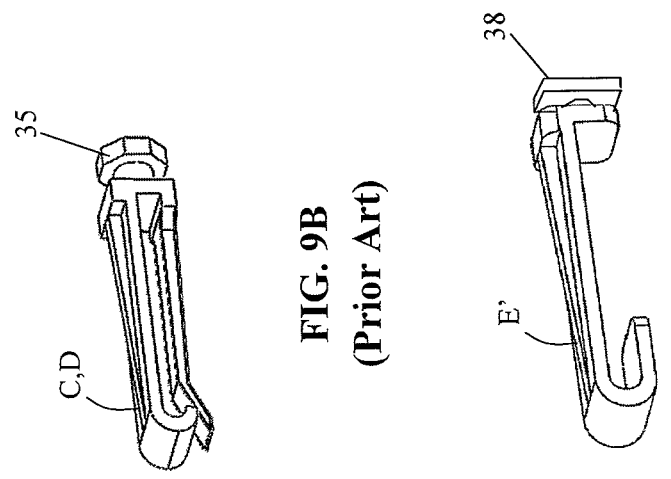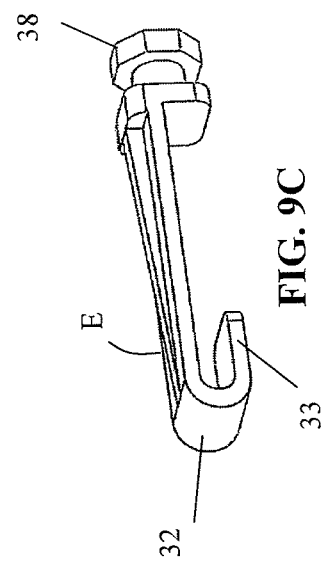
FIG. 9A
FIG. 9B
(Prior Art)
FIG. 9C
FIG. 9D

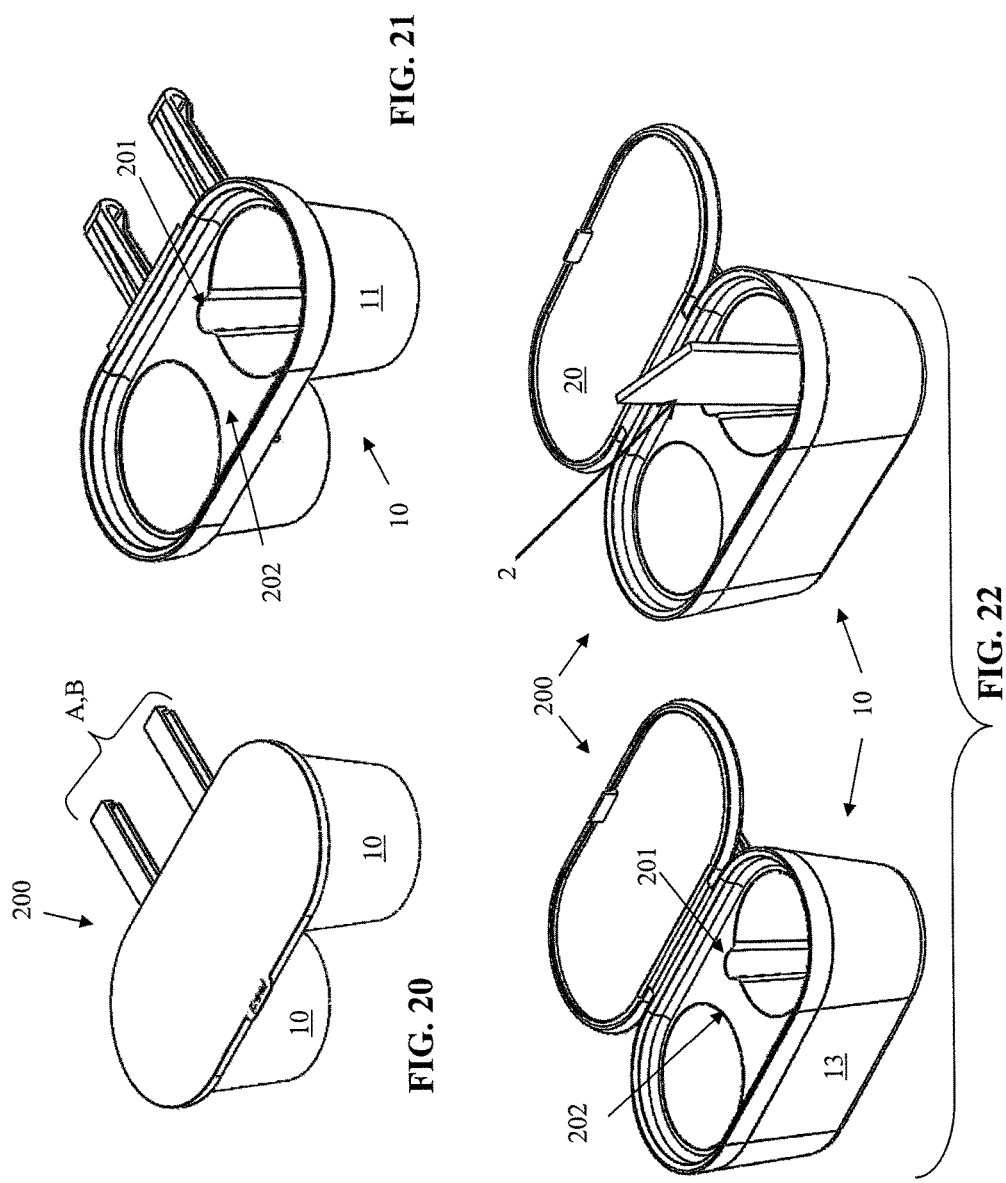

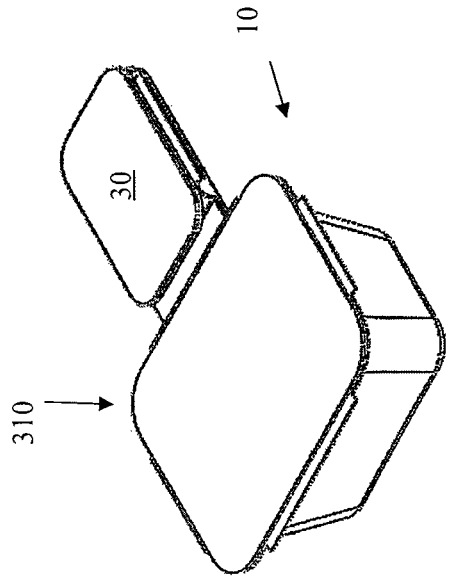
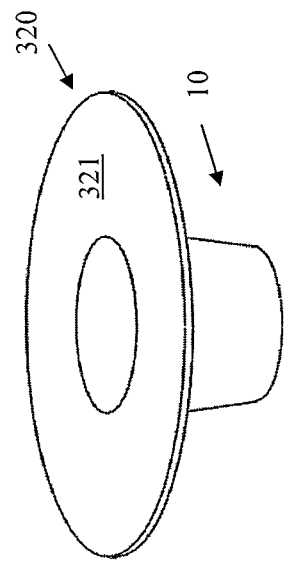
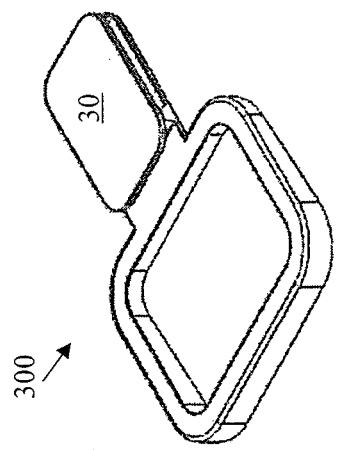
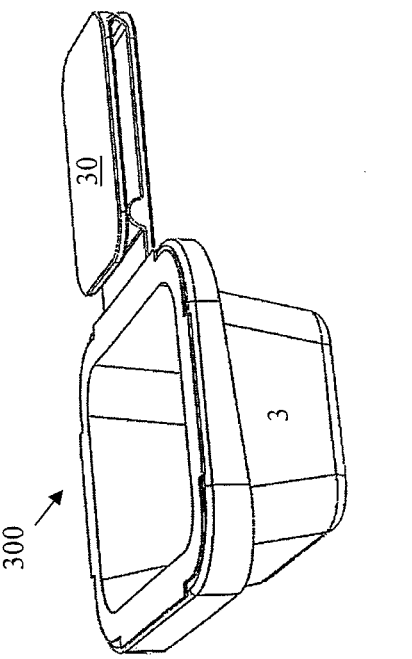
FIG. 26
FIG. 27
FIG. 28

VEHICLE AFFIXABLE FOOD HOLDER AND CLIP

CROSS REFERENCE TO RELATED APPLICATIONS

This application claims priority under 35 USC 119(e) to U.S. Provisional Patent Application No. 61/679,979, entitled VEHICLE AFFIXABLE FOOD HOLDER AND CLIP, filed Aug. 6, 2012, the contents of which are incorporated herein by reference in their entirety.

FIELD OF INVENTION

The present invention relates to accessories useful in vehicles for holding items, such as foods and food receptacles.

BACKGROUND

There presently exists a few types of cup holders that can be used in vehicles. Such cup holders typically include a ring or round basket and a flat bottom piece coupled to a vertically oriented hook. The cup holder accommodates receipt of a cup, while the vertical hook can engage a portion of a vehicle, such as a car door. Other cup holders can include vent clips, instead of the vertical hook, which extend horizontally into vehicle vents.

The horizontally oriented clip includes a top arm and a bottom arm. The top arm has a hooked distal end that wraps behind the back of a vent fin. The bottom arm has an angled distal end that is biased against the hooked distal end of the top arm. In combination, the angled distal end of the bottom arm eases insertion of a vent fin within the clip and the hooked distal end of the top arm maintains the fin within the clip.

To remove the clip from the fin, the angled distal end of the bottom arm must be forced away from the hooked distal end of the top arm to create an opening through which the vent fin can slide.

In some instances two of such clips are used to hold a cup holder, or other item, within a vehicle.

SUMMARY OF INVENTION

In accordance with one aspect of the present invention, provided is a vehicle food holder or container (collectively "food holder"), comprising a housing or cup configured to hold at least one food item or food receptacle and a clip configured to removably attach the food holder to an internal portion of a vehicle. The food item may be a non-beverage food item, such as a sauce, dip, dressing, or other condiment.

In various embodiments, the cup can define an opening forming a single food compartment. The food compartment can take to form of a substantially hollow void. The food compartment can form an opening to receive an external cup or container.

In various embodiments, the cup can define an opening defining two (or more) food compartments. One or both of the two food compartments can take the form of one or more substantially hollow voids.

In various embodiments, an opening can be formed between the two food compartments. The opening can accommodate use of the two food compartments as a single food compartment.

In various embodiments, the food holder can include one or more removable divider inserts configured to adapt the cup between a single and double cup configuration.

In some embodiments, the food holder can include a removable insert in the form of a ring that is insertable in the cup. In some embodiments the ring can define an insert cup that fits within the cup. In some embodiments, the ring can include a peripheral band having a plurality of flexible members extending from the ring toward the center of the cup, and configured to accommodate insertion of different size and/or shape items. In some embodiments, the ring can be a rubber or silicone ring.

In various embodiments, one or more food compartments can be double walled. In such embodiments, the cup may comprise an inner shell and an outer shell. In some embodiments, the inner shell may be removable from the outer shell.

In various embodiments, one or more food compartments can be lined with a thermally insulating material or fluid, e.g., a ceramic material or the like.

In various embodiments, the clip can be a single-arm clip having only one arm configured to couple to a fin of a vehicle vent.

In various embodiments, the single-arm clip can include a distal end having an extended J-hook.

In various embodiments, the J-hook of the clip includes a U-shaped portion having a return. The U-shaped portion can include two substantially parallel segments joined by a curved segment, wherein a top segment extends from the housing to the curved segment and a return segment extends from the curved segment toward to the cup. In such cases, the return segment is shorter than the top segment. In some embodiments, the top segment and return segment are substantially parallel. In other embodiments, the return segment is biased upward from the U-shaped portion toward the top segment.

In various embodiments, the single arm clip can be formed of a metal, plastic, resin, or similar material.

In accordance with another aspect of the present invention, provided is a vehicle food holder, comprising a cup configured to hold at least one food or food receptacle and a plurality of clips configured to removably attached the food holder to an internal portion of the vehicle.

In various embodiments, the plurality of clips can include at least one single-arm clip having only one arm configured to couple to a fin of the vehicle vent. The plurality of clips may include a second single arm clip or a different clip, e.g., a double arm clip. This other clip can also be configured to couple to a fin of a vehicle.

The fin or fins can be vertical or horizontal.

In various embodiments, the plurality of clips can include at least one clip that is movable with respect to a second clip, such that moving the at least one clip brings the two clips closer together or further apart. In some embodiments, only one clip is slide-able with respect to the other. In still other embodiments, the two clips are slide-able with respect to each other. In various embodiments, the moveable clip is slide-able within a channel formed in the cup. In various embodiments, two clips are slide-able within two separate channels. In other embodiments, two clips are slide-able within the same channel.

In various embodiments, one clip is removable from the cup. In other embodiments, the two clips are removable from the cup.

In various embodiments, one clip is rotatable, e.g., to change is orientation, e.g., from horizontal to vertical. In other embodiments, both clips are rotatable. In some embodiments, the at least one clip can be rotatable up to about 360 degrees.

In various embodiments, a plurality of clips may be molded with the cup. In such embodiments, one or more of the plurality of clips may be breakaway clips that have a predetermined breakaway point or seam with the cup to enable selective removal of one or more of the clips from the cup.

In various embodiments, the food holder includes a lid that can open and close to cover one or more compartments. If there is more than one compartment, each compartment can have its own lid, a single lid could cover more than one compartment, or some combination thereof.

In various embodiments, the cup or compartment can be removable from the cup.

In various embodiments, a plurality of different types of cups or compartments can be interchangeably placed within the cup.

In various embodiments, at least one cup or compartment can include a substantially vertical channel configured to maintain an item in an upright or vertical position.

In various embodiments, the food holder can include a plurality of different types of inserts configured to fit within one or two cups or compartments. In some embodiments, a single insert can fit within two cups.

In some embodiment, the cup or compartments are configured to receive disposable paper cups, such as paper condiment cups.

In accordance with another aspect of the present invention, provided is a vehicle food holder, comprising a cup configured to hold at least one food item or receptacle and at least one clip configured to removably attach the food holder to an object within a vehicle.

In various embodiments, one or more clip can be L-shaped. The one or more L-shaped clips can be configured to removably attach to a vent, a seatback pocket, a door pocket, or the like.

In various embodiments, the one or more clip can be at least one strap. The at least one strap can be configured to tie or connect around a post or posts of or supporting a head rest, or other internal car part.

In various embodiments, the one or more clip can include an arm having an adhesive surface, e.g., Velcro. For example, the Velcro surface could be configured to attach to a fabric surface or a mating Velcro pad adhered to an object in or an internal surface of a vehicle, e.g., a seat back, dashboard, console, or door. In various embodiments, the one or more clip can include a magnet.

In various embodiments, the cup or compartment can be configured to hold a paste, sauce or other liquid, such as, as examples, dipping sauces, condiments, and salad dressings.

In various embodiments, the cup can include a detent mechanism, which can be configured to be deployed from the food holder to maintain the cup in a preferred position, e.g., substantially upright.

In various embodiments, the detent mechanism can include a slide-able member or arm coupled to the cup, or a portion thereof, wherein the slide-able member is configured to move in the direction of the clip, or clips, relative to the cup.

In various embodiments, the detent mechanism can take the form of an arm that travels within a channel formed at the bottom of the cup and a tab that extends through the channel and couples to the cup. The tab may be configured to maintain the detent coupled to the cup, while enabling the arm to move relative to the cup. In some embodiments, the cup may include one or more grooves and the arm may include one or more corresponding bosses configured to travel within the one or more grooves when the detent is deployed. In some embodiments, the one or more grooves can include at least one groove with friction bumps to provide resistance to a boss traveling therein.

In another embodiment, the detent can take the form of an arm that is substantially maintained within the cup in an un-deployed state and is at least partially extended from the cup in a deployed state.

In some embodiments, a bottom portion of the cup can define a channel within which the arm is maintained. In some embodiments, the bottom of the cup can include one or more flex arms biased against the arm and configured to provide resistance for transitioning the arm from the deployed state to the un-deployed state.

In various embodiments, the cup can be removable from the one or more clips, without decoupling the one or more clips from the corresponding internal portion of the vehicle, e.g., one or more vent fins.

In accordance with yet another aspect of the present invention, provided is clip for use with an item holder, wherein the clip includes a top arm with an extended J-hook and no bottom arm. The clip is removably securable to vent fins.

In various embodiments, the extended J-hook includes a U-shaped portion having an extended return.

In various embodiments, the U-shaped portion includes two substantially parallel straight portions connected by a semicircular curved portion.

In various embodiments, the two substantially parallel straight portions include an elongated top member extending from the cup to the curved portion and a return member extending from the curved portion part way toward the cup.

The top member is longer than the return member, e.g., at least twice as long. In some embodiments, the return member is at least about a ¼ inch long.

In various embodiments, the fin or fins can be vertical, horizontal, or diagonal.

The clip can attach to a food container or receptacle.

In accordance with another aspect of the invention, provided is a prepackaged food receptacle having a food item sealed therein and having at least one clip configured to couple to an internal portion of a vehicle, such as a fin of a vehicle vent.

The at least one clip can be any clip described herein above, such as at least one single arm clip having an extended J-hook.

The food within the receptacle can be a condiment, sauce, or dressing, as examples.

According to aspects of the present invention, provided is a vehicle food holder, as shown.

According to aspects of the present invention, provided is an extended J-hook clip, as shown According to another aspect of the invention is provided a disposable prepackaged food container, as shown.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings:

FIGS. 1-3 are perspective views of embodiments of three different vehicle food holders, in accordance with the present invention;

FIG. 4 includes left and right perspective views of another embodiment of a vehicle food holder, in accordance with the present invention;

FIG. 5A is includes left side, front, and right side views of another embodiment of a vehicle food holder; FIG. 5B includes a side perspective view of the vehicle food holder of FIG. 5A with vertical fins; FIG. 5C includes a top perspective of the vehicle food holder of FIG. 5A.

FIGS. 6 and 7 are rear perspective view of other embodiments of a food holder; in accordance with the present invention;

FIGS. 8A-8C include perspective views of embodiments of a vehicle food holder with a lid in the closed position and in an open position, in accordance with the present invention;

FIG. 9A shows an embodiment of features of a coupler useful with a vehicle food holder, in accordance with the present invention;

FIGS. 9B-9D show embodiments of various clips useful with a vehicle food holder, in accordance with the present invention;

FIGS. 20-22 are perspective views of embodiments of different double-cup vehicle food holders, in accordance with the present invention;

FIGS. 26-32 show various embodiments of accessories and adaptations for a vehicle food holder, in accordance with aspects of the present invention.

DETAILED DESCRIPTION

Figure 5D:
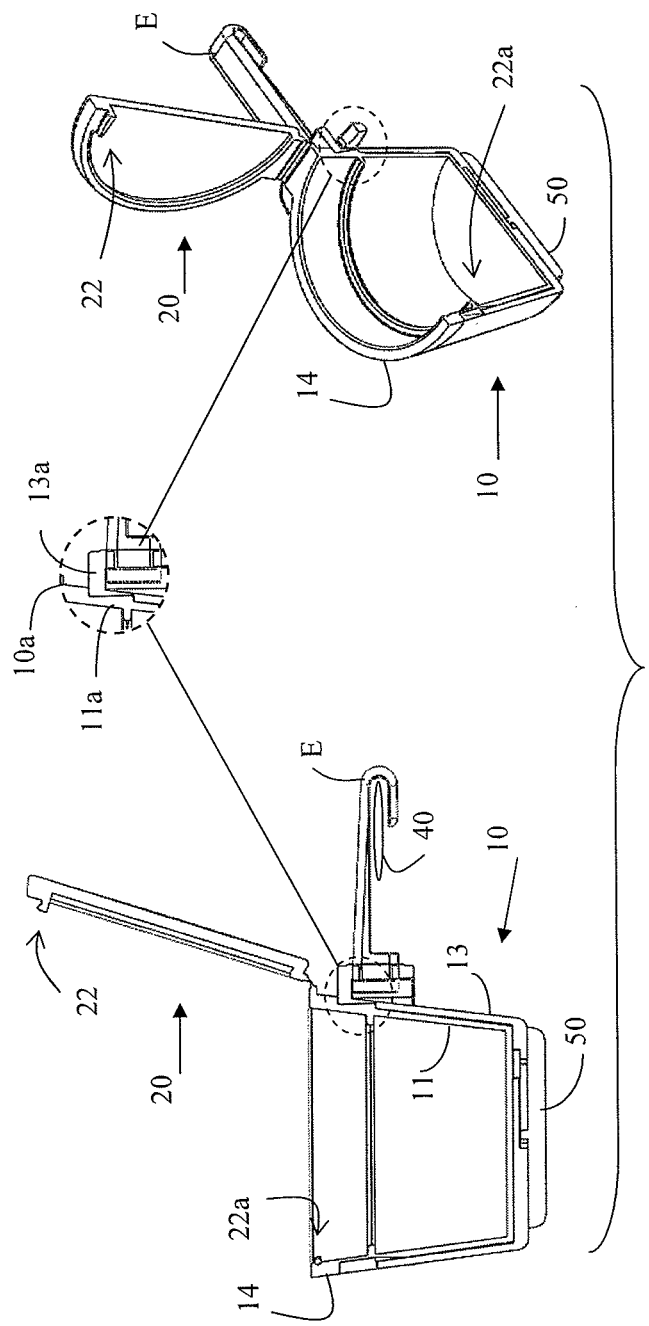
FIG. 5D includes side and perspective cross-sectional views taken along X-X in FIG. 5A, in accordance with the present invention.

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes illustrated herein, but are to include deviations in shapes that result, for example, from manufacturing.

The present invention is directed to a food holder that is useful in a vehicle for steadily holding a food item for an occupant of a vehicle, e.g., a driver or passenger. Those skilled in the art will appreciate, however, that such food holder may be useful in other environments or settings. Those skilled in the art will also appreciate that the fold holders (or containers) in accordance with the inventive concept can be used with any of a variety of types of foods, including sauces, dips, dressings, and the like. Those skilled in the art will also appreciate that the fold holders can be used to hold food directly or in prepackaged cups or containers.

FIGS. 1-3 are perspective views of embodiments of three different vehicle food holders, in accordance with the present invention.

FIG. 1 shows an embodiment of a vehicle food holder 100 in the form of a disposable unit. Food holder 100 includes a single cup 10, a lid 20, and a coupler 30. In other embodiments, the lid may be omitted. Cup 10 includes a substantially hollow internal portion (not visible, but present beneath lid 20) configured to hold a food item, such as a sauce, ketchup, dip, or dressing, as examples.

Coupler 30 is configured to attach cup 10 to an internal surface or portion of a vehicle, e.g., car, van, SUV, or truck. In this embodiment, coupler 30 includes two clips A, B extending from cup 10, substantially in parallel. The clips A, B are configured to couple to one or more fins of a vehicle air vent to stably hold cup 10 upright, without substantial risk of tipping. Each of clips A, B includes a top arm and a bottom arm that cooperate to removably secure to a fin, wherein a fin would be disposed between the top and bottom arms. The top arm has a distal end with a curved portion, forming a "J"-hook. In this embodiment, with two arms, the curved portion is relatively short, such that it extends behind, but not substantially under, the fin.

The fold holder of FIG. 1 may be disposable, e.g., single use, then thrown away. Therefore, it can be made out of rigid paper, plastic, or any other suitable material. The food holder 100 may come pre-filled with food, e.g., dipping sauce, ketchup, apple sauce, and so on. Otherwise, it may come empty and ready to receive food from a user.

FIG. 2 shows an embodiment of food holder 100 that includes cup 10, without a lid. Here, a void 12 formed within cup 10 is visible. A main body of cup 10 is shell 11, within which a substantial portion of cup 12 is defined. At its top, cup 10 includes a rim 14 that defines a ledge 15. Beneath ledge 15, and internal to cup 10, is formed a substantial portion of void 12. In this embodiment, an internal diameter of rim 14 is greater than an internal diameter of at least an upper portion of the internal portion of cup 10 forming void 12, thereby forming ledge 15. Void 12 and rim 14 may be configured to receive a food-holding cup, such as the small disposable paper or plastic cups typically used for ketchup and sauces in fast-food restaurants. (e.g., see FIG. 8) Such small disposable paper cups typically include a top lip that could be seated on and supported by ledge 15.

In FIG. 2 the coupler 30 includes two clips C, D. Clips C, D are similar to clips A, B in that they also have top and bottom arms, wherein the top arm distal end has a small curved portion that forms a "J-hook." The specific clip embodiment of clips C, D may be similar to those available for other uses in the prior art, although cup 10 and food holder 100 are not known in the prior art. The top and bottom arms of clips C, D cooperate to engage a fin, such as a fin in a vehicle air vent.

The food holder 100, in this embodiment, is a reusable food holder. In such an embodiment, the food holder can be a rigid, washable, leak-proof container. It can optionally also be dishwasher and microwave safe. Accordingly, food holder 100 can be made of plastic, or other known materials. In various embodiment, cup 10 may or may not be thermally insulated, or have thermal insulating properties.

FIG. 3 shows an embodiment of food holder 100 similar to that of FIG. 2, but cup 10 includes an outer shell 13, wherein shell 11 may be an inner shell disposed within outer shell 13. In some embodiments, outer shell 13 and inner shell 11 may be integrally formed as a single unit. In other embodiments, outer shell 13 and inner shell 11 may be discrete pieces, either permanently or removably combined together. Thus, outer shell 13, like inner shell 11, may be considered to form part of cup 10.

Outer shell 13 may provide thermal insulation to cup 10, forming a thermally insulated cup 10. Outer shell 13 may be a double-wall unit, with a gap formed between an outer wall and an inner wall of outer shell 13. For example, air or some other material, liquid or gas may fill the gap to, for example, provide thermal insulation. In other embodiments, outer shell may have a single-wall construction, but a gap may be formed between the outer shell 13 and inner shell 11.

In FIG. 3, coupler 30 is substantially the same as that of FIG. 2.

FIG. 4 includes left side and right side views of another embodiment of a vehicle food holder 100. This embodiment of food holder 100 is similar to that of FIG. 3, but includes a lid 20, which is shown in an open state. Lid 20 is configured to close cup 10 and cover void 12, and may include a tab 22 to engage rim 14. Lid 20 may or may not be thermally insulated, or have thermal insulating properties, as discussed above. Lid 20 may be a rigid, washable, leak-proof lid, which can optionally also be dishwasher and microwave safe.

In FIG. 4, a set of fins 40 is shown with a double arrow depicting a direction of insertion and removal of coupler 30 to removably attach food holder 100 to fins 40. The embodiment of food holder 100 having a lid is shown with fins 40 as an example, but the other food holder embodiments with horizontal clips would similarly engage with fins 40.

FIG. 5A includes left side, front, and right side views of an embodiment of food holder 100 similar to that of FIG. 4, but with a different coupler 30. In each view, lid 20 is open. FIG. 5B includes a top perspective of the vehicle food holder of FIG. 5A; and FIG. 5C includes side and perspective cross-sectional views taken along X-X in FIG. 5B.

FIG. 5B shows an embodiment of the vehicle food holder 100 of FIG. 5A with the clips E turned 90 degrees so achieve an orientation useful for engaging vertical fins 40. In such embodiments, clips E may be individually rotatable. In other embodiments, clips E could be collectively rotatable, see, for example, the embodiment of FIG. 14. The same could be true for other types of clips, e.g., clips C, D.

Additionally, as shown in FIG. 5D, an annular snap 10a feature is included that fastens inner shell 11, which can take the form of a removable cup or container, to outer shell 13. This results in no fastening seen from inside the cup 10 or void 12. The annular snap is formed from an inner annular recess formed in outer shell 13. The annular snap 10a comprises an indent 13a defined in outer shell 13 and a corresponding projection 11a on an external surface of inner shell 11. When inner shell 11 is pressed into outer shell 13, the projection 11a snaps into the indent 13a. In this embodiment, the annular snap 10a extends annularly for at least a portion of the circumference of the inner and outer shells 11, 13. Also preferably, the snap fit is such that inner shell 11 can be snapped in an out of outer shell 13.

The cross-sectional views of FIG. 5D also shows portions of an embodiment of a snap closure that secures lid 20 closed to cup 10 via tab 22. In this embodiment, rim 14 includes an internal projection 22a configured to engage tab 22. Tab 22 is made to be somewhat flexible so that it can snap onto and off of projection 22a in response to a user's hand action.

In FIGS. 5A-5D, coupler 30 includes at least one clip E. Clip E includes a top arm, but not a bottom arm. Clip E includes a distal end with an extended curve that forms an extended J-hook 32. In this embodiment, the extended J-hook includes an extension 33 that extends toward cup 10 and beneath the portion of the arm that extends between the cup and curve. The extension 33 may be straight and may be substantially parallel to the arm. The extended J-hook 32 is configured to enable securing the food holder 100 to a fin 40 without need of a bottom arm, as is shown.

At the bottom of cup 10 may be provided a detent 50. In this embodiment, detent 50 is configured to extend from the bottom of cup 10 in the direction of coupler 30 and may be used to maintain a bottom of cup 10 at a distance from the fins (or other vehicle surface or part) to substantially maintain the food holder is in upward orientation for use without significant risk of spilling. Detent 50, and embodiments thereof, will be described in greater detail below.

FIGS. 6 and 7 are rear perspective view of other embodiments of a food holder; in accordance with the present invention. In each of FIGS. 6 and 7, the clips take the general form of clips E in FIGS. 5A-5D, with extended J-hooks.

In FIG. 6, a first clip E1 is secured and not movable with respect to cup 10. For example, clip E1 may be molded with cup 10. However, a second clip E2 is horizontally movable with respect to cup 10, within a slot 34. As such, an end of clip E1 proximate to cup 10 may include an anchor 35 configured to slide left and right within slot 34. The enabled horizontal movement of at least one clip, here clip E2, allows the coupler to be configurable, and reconfigurable, for use with different vent or fin widths or configurations. Therefore, coupler 30 may be considered to be a reconfigurable coupler 30.

In FIG. 7, the coupler 30 includes two clips E2, similar to clip E2 in FIG. 6. Thus, each of clips E2 may have anchors 35 configured to slide within respective slots 34, as discussed above with respect to FIG. 6.

FIGS. 8A-8C includes perspective views of embodiments of a food holder 100 with a lid 20 in a closed position and in an open position, in accordance with the present invention. Food holder 100 in FIGS. 8A-8C may similar to the food holders in FIGS. 4 and 5A-5C, as examples. In this embodiment, food holder 100 in FIGS. 8A and 8B has the clips C, D shown in FIG. 4, while food holder 100 in FIG. 8C has the clip E shown in FIGS. 5A-5D. With lid 20 in the closed position, in FIG. 8A, void 12 is completely closed. This allows for storage of food within cup 10. As shown in FIG. 8B with lid 20 open, one or more disposable paper or plastic cups 1 may be stored within cup 10. As shown in FIG. 8C, a prepackaged cup 4 may be inserted and/or stored in food holder 100. In each of FIGS. 8B and 8C, lid 20 may be closed to preserve the contents of cup 1, 4.

A lip of such cups 1, 4 may be seated within rim 14 and supported by ledge 15 (not shown), although ledge 15 is not essential to the invention. Also, while cups 1 are described as disposable, it is conceivable that cups 1 may be reusable or may be disposable cup liners, e.g., as in FIG. 8B. Cups 4 may also be prepackaged servings of food, e.g., ketchup or other condiments, dips, sauces, and so on, which fit within cup 10, e.g., as in FIG. 8C.

FIG. 9A shows an embodiment of a feature of coupler 30 useful with a vehicle food holder 100, in accordance with the present invention. In FIG. 9A, a coupler support portion 31 of cup 10 is shown, which includes slot 34, which is a double slot configured to accommodate at least two clips. Slot 34 includes a clip opening 36 configured to receive an anchor of a clip.

FIGS. 9B-9D show embodiments of various clips useful with a vehicle food holder, in accordance with the present invention. In FIG. 9B, clip C, D, includes top and bottom arms and an anchor 35 configured to fit within opening 36 of slot 34. Slot 34 can accommodate two such clips C, D, e.g., one on the slide left and the other on the right within. Clip C, D may be found in the prior art, but not with a food holder in accordance with the present invention.

In FIG. 9C, clip E includes anchor 35, which includes the extended J-hook discussed above. Clip E is also configured to fit within opening 36 of slot 34, and then slide left and/or right within slot 34. Opening 36 is centrally located within slot 34 in this embodiment, wherein at least two clips can be installed, with at least one left and one right, in this embodiment.

In other embodiment, different openings and anchor configurations can be used. For example, in some embodiments, slot 34 need not include an opening 36, and the anchor 38 could be configured to be narrow enough in one dimension (e.g., vertical) for insertion and long enough in another dimension (e.g., horizontal) so that the clip E can be turned 90 degrees from upright for insertion, anchor 38 inserted in slot 34, and then turned upright to be maintained within slot 34. Such a clip is shown in FIG. 9D as clip E'.

FIGS. 10 through 14 show various embodiments of alternative couplers 30 useful with vehicle food holder 100, in accordance with the present invention.

Figure 10:
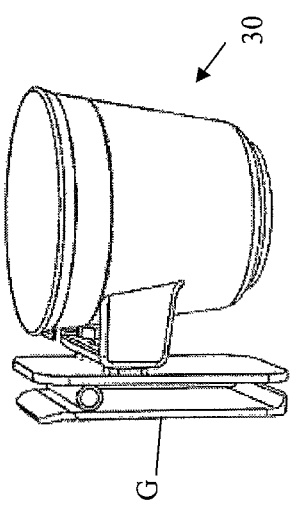
FIGS. 10 through 14 shows various embodiments of couplers useful with a vehicle food holder, in accordance with the present invention.

In FIG. 10, coupler 30 includes one or more "L"-shaped clips F, which could enable the food holder 100 to be hung, e.g., inside a vehicle. For example, L-shaped clips F could be used to hang food holder 100 from seat back pockets, door handles or door pockets.

Figure 11:
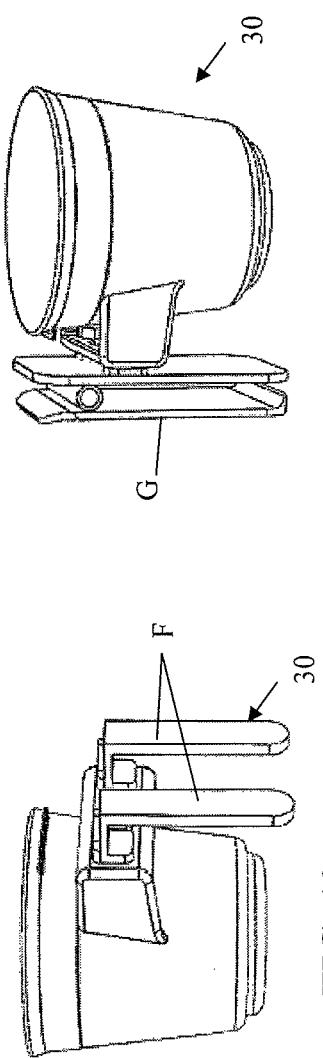

In FIG. 11, coupler 30 includes a clip G, which can be spring loaded and biased in a closed position. Clip G may be used on similar portions of a car interior as L-shaped clips F.

Figure 12:
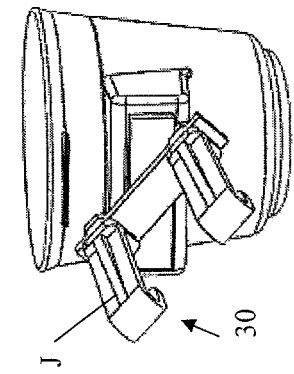

In FIG. 12, coupler 30 could take the form of a magnet or Velcro clip H configured to couple to a substantially flat surface, e.g., a dashboard face, a door panel, a seat surface, and so on.

Figure 13:
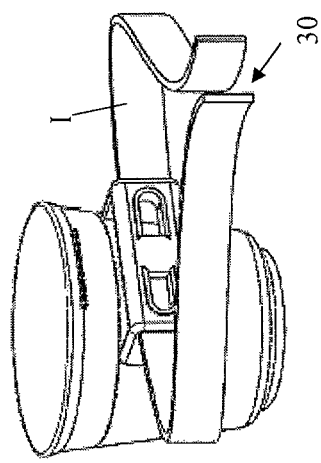

In FIG. 13, coupler 30 can take the form of a strap (or "clip") I, e.g., fabric, plastic, or similar, that could be used to tie or otherwise secure around a vertical portion of a car, e.g., posts of a headrest.

Figure 14:
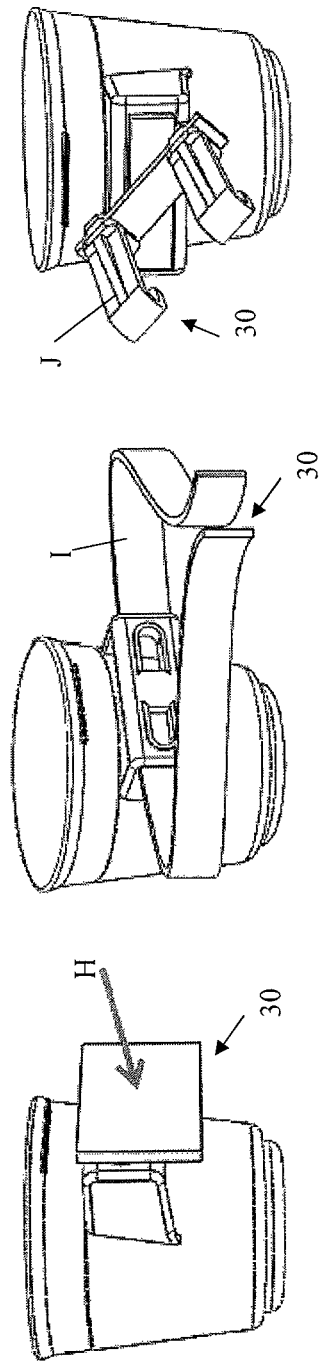

In FIG. 14, coupler 30 can take the form of a rotatable clip J, which could be used to couple the food holder 100 to a diagonal vent, for example. In such embodiments, the clip J preferably has resistance in the rotation so that the cup 10 does not easily rotate and spill its contents.

Figure 15:
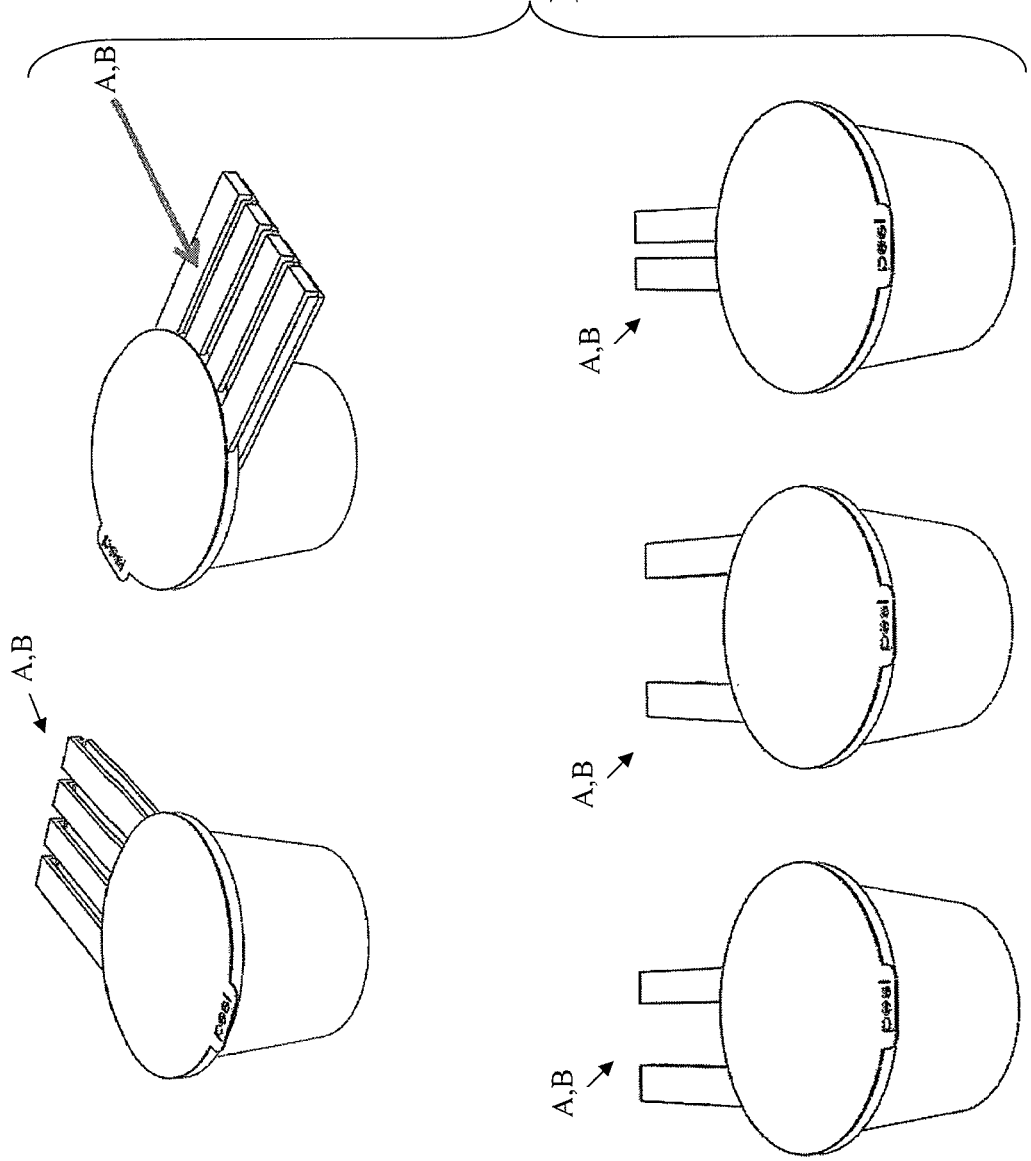
FIG. 15 shows embodiments of a vehicle food holder with a configurable coupler, in accordance with the present invention.

FIG. 15 shows embodiments of a vehicle food holder 100 with a configurable coupler 30. Vehicle food holder 100 may be a disposable unit, as in FIG. 1, as an example. In this embodiment, coupler 30 includes a plurality of clips A, B which can be selectively removed to form a coupler 30 configuration sufficient for the fins, vent, or other interior vehicle part to which the food holder 100 is to be coupled. As such, each clip A, B can be selectively broken off to arrive at the preferred subset of clips A, B.

In FIG. 15, three front views are shown with different subsets of clips A, B, where a leftmost clip is designated clip A and the rightmost clip is designated as clip B. In the left view, the second and fourth clips have been removed. In the center view, the second and third clips have been removed. In the right view, the first and fourth clips have been removed. These are merely examples, less or more clips may be included and/or removed.

Figure 16:
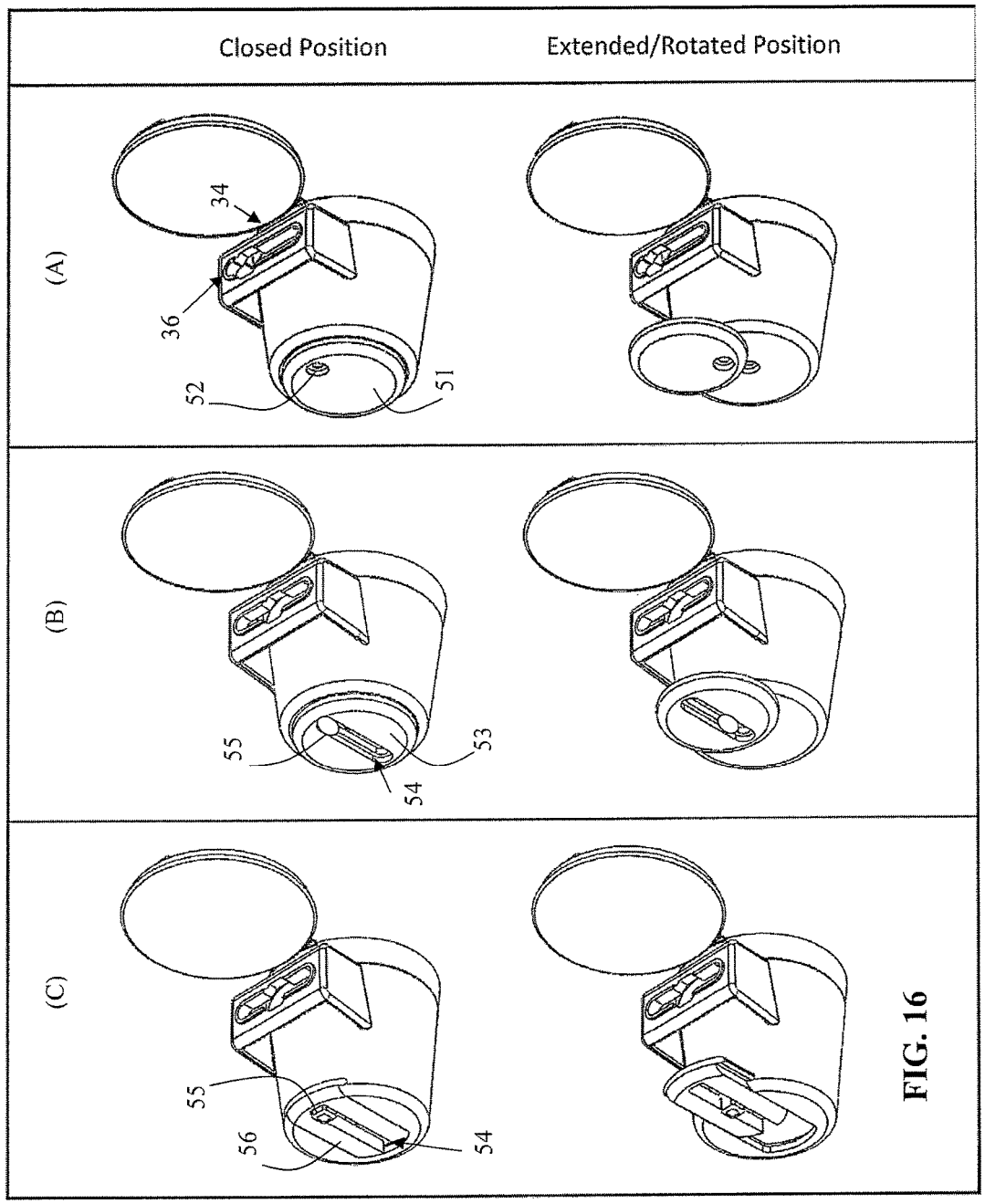
FIG. 16 shows various embodiments of detent mechanisms of the vehicle food holder, in accordance with the present invention.

FIG. 16 shows various embodiments of detents 50 of the vehicle food holder 100, in accordance with the present invention. In each of rows (A), (B), and (C) a left column shows detent 50 in a closed position and the right column shows detent 50 in an open position. In each case, detent 50 can be extended in a direction of the coupler 30, e.g., toward a vent or other car part.

In row (A), detent 50 is in the form of a disk 51 coupled to a bottom of cup 10 via a hinge pin 52 that allows rotation of disk 51 out from the bottom of cup 10. Also, the embodiment of row (A) shows a slot 34 with opening 36 not centered, and off to one side of channel 34.

In row (B), detent 50 is in the form of a disk 53 having a slot 54 coupled to a bottom of cup 10 via a tab 55 that allows disk 53 to slide in and out from the bottom of cup 10.

In row (C), detent 50 is in the form of an arm 56 having slot 54 coupled to a bottom of cup 10 via tab 55 that allows arm 56 to slide in and out from the bottom of cup 10.

Figure 17:
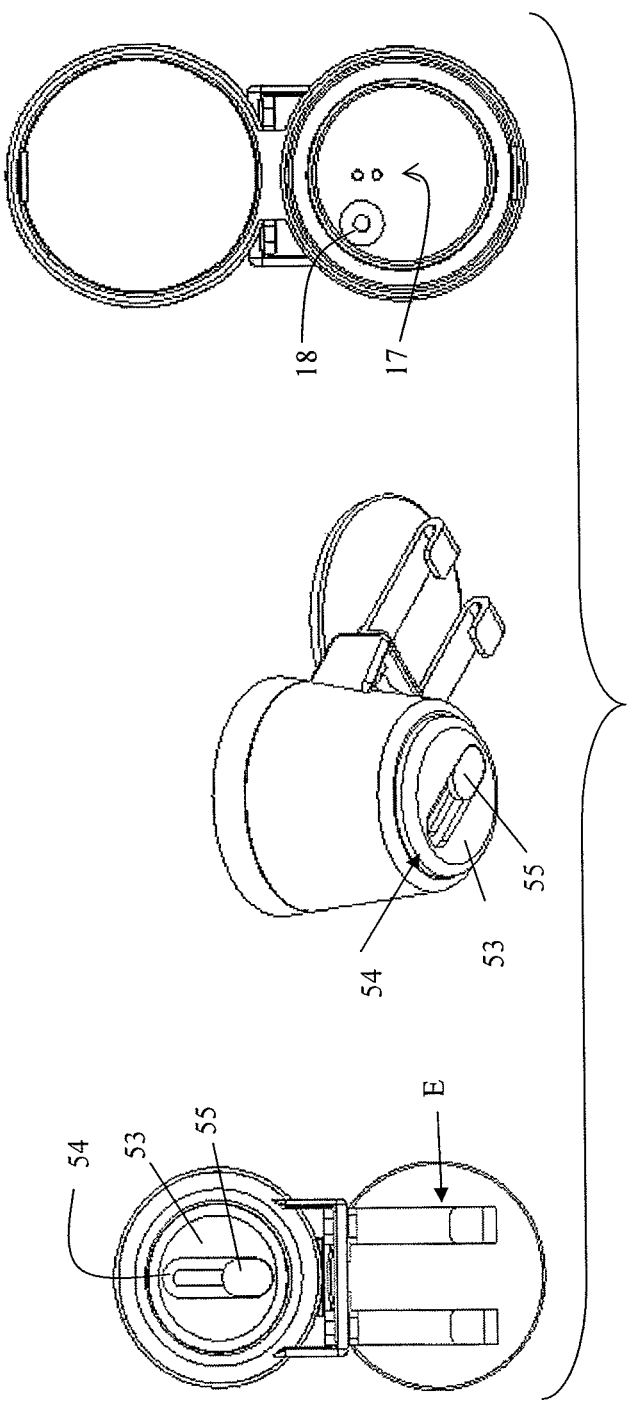
FIG. 17 provides different views of the vehicle food holder with the detent of row (B) in FIG. 16, in accordance with the present invention.

FIG. 17 provides different views of the vehicle food holder 100 with the detent 50 of row (B) in FIG. 16, in accordance with the present invention. The left view is a bottom view, the center view is a side perspective view, and the right view is a top view, looking down inside cup 10 and void 12.

With respect to the top view, holes 17 are shown for use with the detent 50 in FIG. 16 row (B) and hole 18 may optionally for the detent 50 of FIG. 16, row (A).

Figure 18:
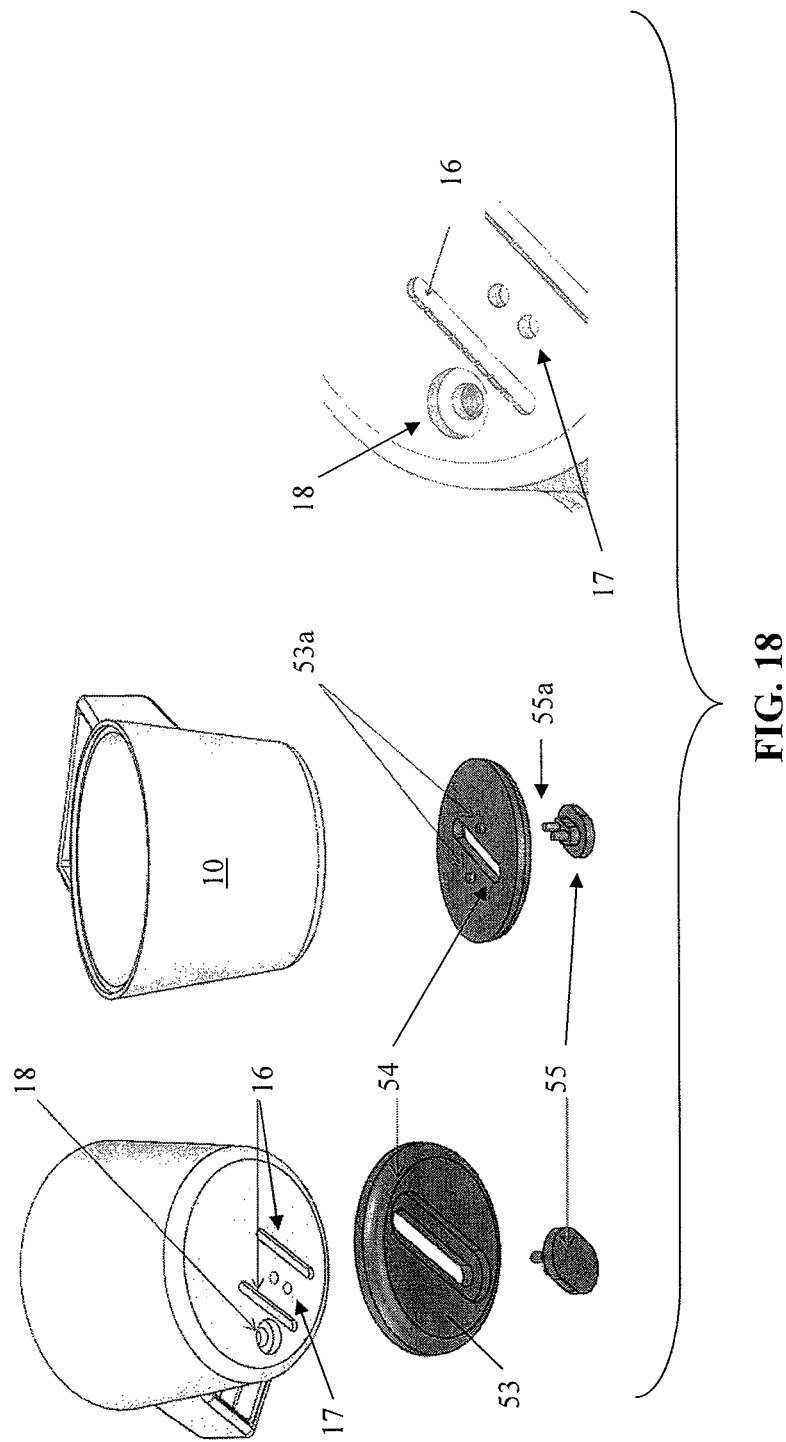
FIG. 18 provides different views of the vehicle food holder with the detent of row (B) in FIG. 16 and FIG. 17, in accordance with the present invention.

FIG. 18 provides different views of the vehicle food holder 100 with the detent 50 of row (B) in FIG. 16 and FIG. 17, in accordance with the present invention. In this embodiment, at the bottom of cup 10, there is a pair of slots 16 with built in friction bumps 16*a*. Tab 55 fits through slot 54 and includes two posts 55*a* configured to secure into holes 17 at the bottom of cup 10. With the tab posts 55*a* secured into holes 17, through disk 53, tab 55 remains fixed with respect to the bottom of cup 10 and disk 53, even when disk 53 is extended. Disk 53 includes disk bumps 53*a* configured to travel through slots 16 in the bottom of cup 10 when the disk 53 is extend. Friction bumps 16*a* of slots 16 provide travel resistance to the disk bumps 53*a* and, therefore, to disk 53 so that disk 53 can maintain its extended position when in use. To extend disk 53, a user may push disk 53 out from the bottom of cup 10, and it may be returned by pushing disk 53 in an opposite direction.

Hole 18 in the bottom of cup 10 shown in FIGS. 17 and 18 may be included with the detent 50 embodiment of FIG. 16 row (A) to receive hinge pin 52 for rotatable disk 51. Hole 18 is not necessary for the detent 50 shown in FIG. 16 row (B) and FIGS. 17 and 18.

Figure 19:
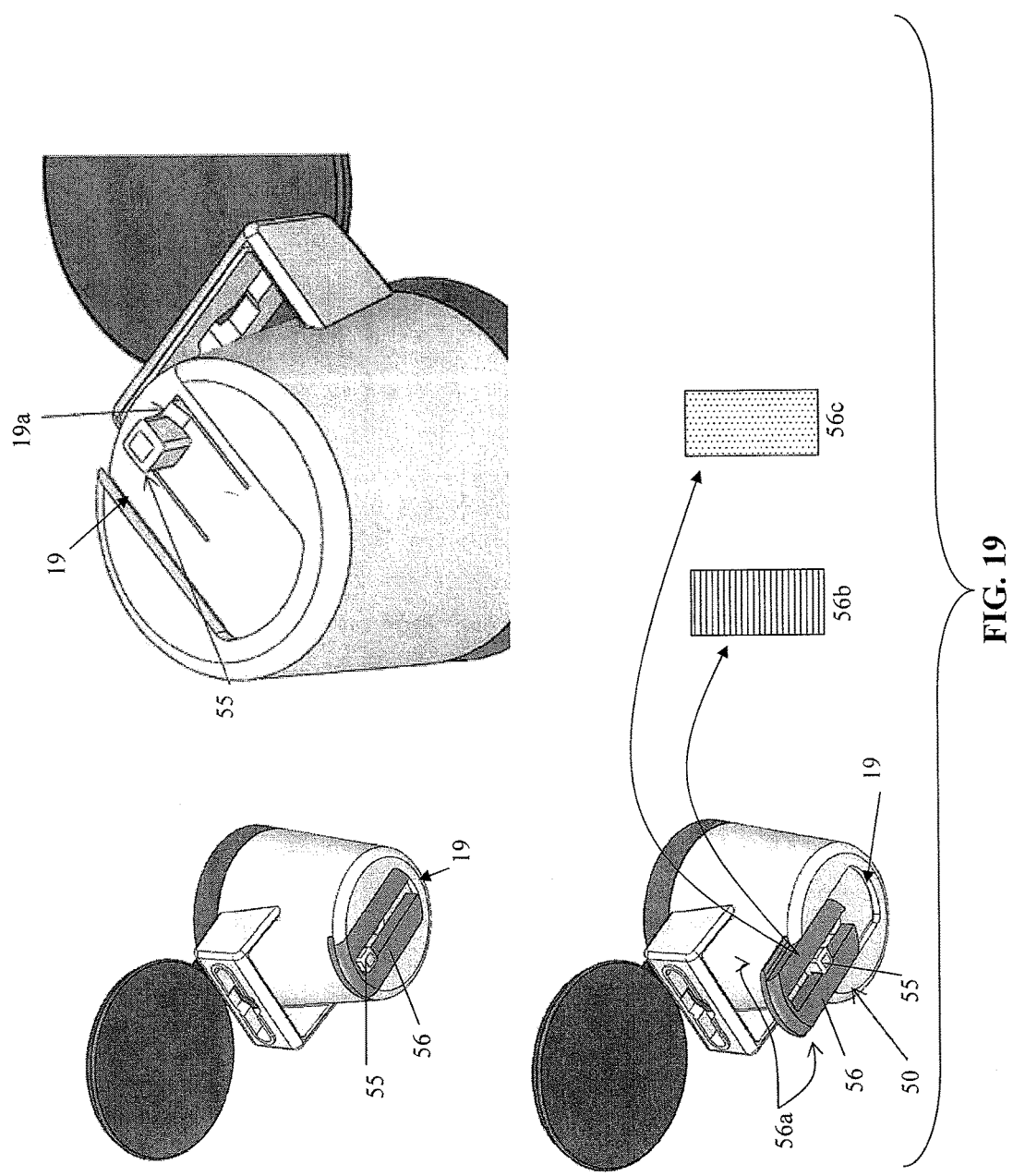
FIG. 19 provides different views of the vehicle food holder with the detent of row (C) in FIG. 16, in accordance with the present invention.

FIG. 19 provides different views of vehicle food holder 100 with the detent of row (C) in FIG. 16, in accordance with the present invention. In FIG. 19, arm 56 of detent 50 travels within a cup channel 19 to extend for use. Tab 55 may formed integral with the cup bottom (as shown) or later affixed and secured to the cup bottom. One or more flex arms 19*a* may be formed within the cup channel 19 to provide resistance to the sliding movement of arm 56. In this embodiment, two flex arms 19*a*, one on each side of tab 55, are biased toward a top of arm 56 to provide the resistance. The top surface of arm 56, closest to and facing the bottom of cup 10, may be patterned to increase friction with flex arms 19*a*. Such patterning may take the form of ridges 56*b* or protrusions 56*c*, as examples.

FIGS. 20-22 are perspective views of embodiments of different double-cup vehicle food holders, in accordance with the present invention.

FIG. 20 shows an embodiment of a disposable double-cup vehicle food holder 200, similar to the disposable single food cup holder 100 of FIG. 1. Food cup holder 200, includes two cups 10, a lid 20 to cover the cups, and a coupler 30. In this example, coupler 30 includes clips A and B. As with the embodiment of FIG. 15, coupler 30 may originally include a plurality of clips, e.g., 3 or more, that can be individually be removed to enable the user to configure the coupler as desired, by selectively removing clips A, B.

FIG. 21 shows an embodiment of a double-cup food holder 200, similar to that shown in FIG. 2. A main body of each cup 10 is shell 11, within which a substantial portion of void 12 is defined. In some embodiments, at least one of the cups 10 may include notch 201, here vertically oriented. Notch 201 could also be included in any of the single cup embodiments, such as those discussed above.

Between the two cups 10 may be formed or included a cup divider 202. In FIG. 21, coupler 30 includes clips C, D, but clip E, as an example, could be used.

FIG. 22 shows an embodiment of food holder 200 similar to that of FIG. 21, but cup 10 includes an outer shell 13, wherein shell 11 (not visible) may be an inner shell disposed within outer shell 13. In that regard, the embodiment of FIG. 22 is also similar to that of FIG. 3.

In some embodiments, outer shell 13 and inner shell 11 may be integrally formed as a single unit. In other embodiments, outer shell 13 and inner shell 11 may be discrete pieces, either permanently or removably combined together. Thus, outer shell 13, like inner shell 11, may be considered to form part of cup 10.

Outer shell 13 may provide thermal insulation to cup 10, forming a thermally insulated cup 10. Outer shell 13 may be a double-wall unit, with a gap formed between an outer wall and inner wall of outer shell 13. For example, air or some other material, liquid or gas may fill the gap to, for example, provide thermal insulation. In other embodiments, outer shell may have a single-wall construction, but a gap may be formed between the outer shell 13 and inner shell 11.

In FIG. 22, coupler 30 may substantially the same as those of FIG. 2-4 or 5A-5C.

In FIG. 22, notch 201 is shown helping maintain a food item 2 in a vertical position, which could be a regular sauce pack (e.g., for ketchup, mustard, mayonnaise, wasabi, hot sauce, soy sauce, etc.).

Between the two cups 10 may be formed or included a cup divider 202. In such embodiment, cup divider may be removable to form a larger single cup. Therefore, in some embodiments, the cup may be reconfigurable between single, double, or other types of cups.

Figure 23:
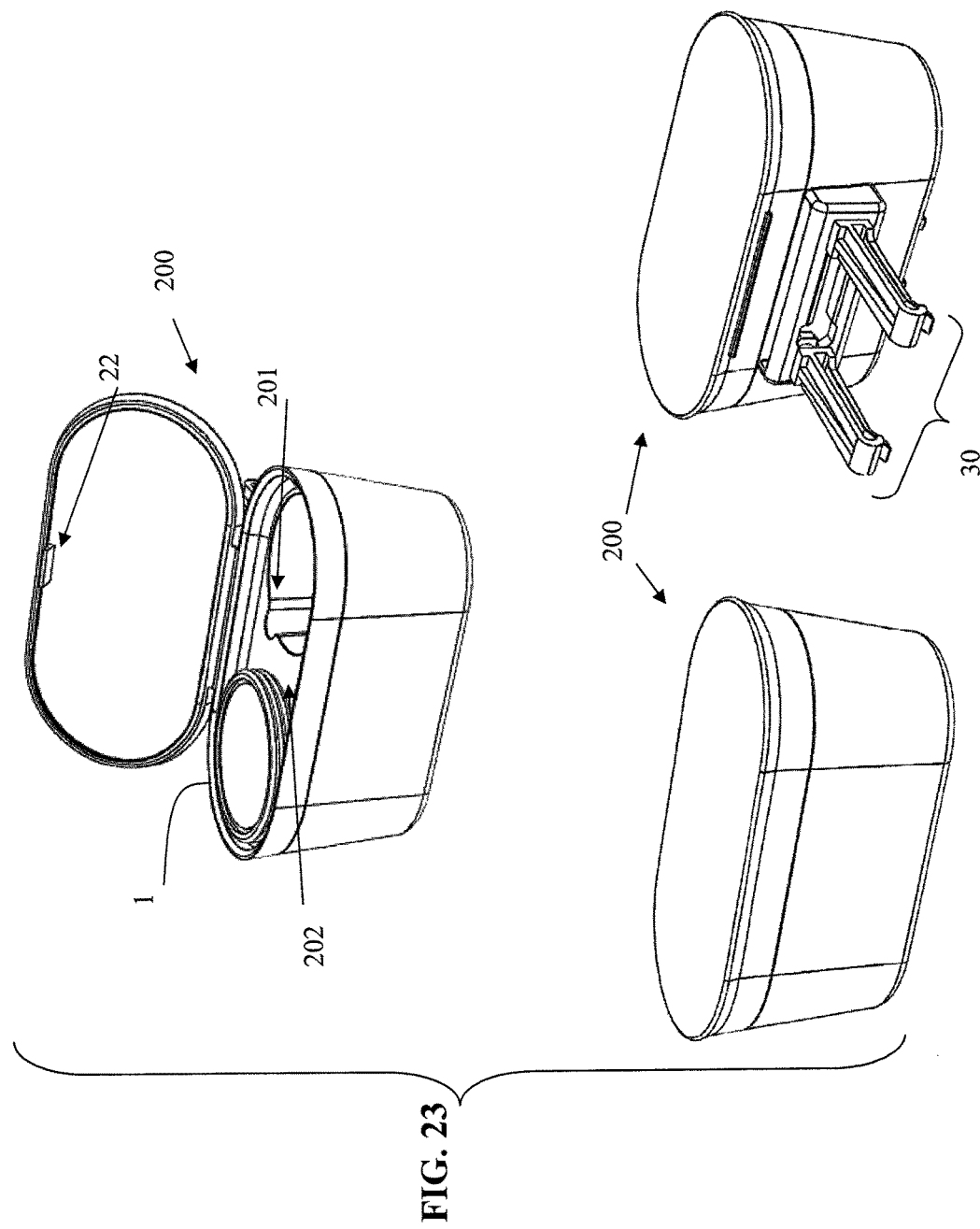
FIG. 23 includes perspective views of an embodiment of a vehicle food holder with a lid in the closed position and in an open position, in accordance with the present invention.

FIG. 23 includes perspective views of an embodiment of a vehicle food holder 200 with a lid 20 in the closed position and in an open position, in accordance with the present invention. With lid 20 in the closed position, void 12 is completely closed. This allows for storage of food within cups 10. As shown with lid 20 open, disposable paper or plastic cups 1 may be stored within at least one of the cups 10, or prepackages food cups 4 as another example. A lip of such cups 1 may be seated within rim 14 and supported by ledge 15 (not shown), although ledge 15 is not essential to the invention. Also, while cups 1 are described as disposable, it is conceivable that cups 1 may be reusable or may be disposable cup liners. Cups 4 may also be prepackaged servings of food, e.g., ketchup or other condiments, dips, sauces, and so on, which fit within cup 10.

The rear perspective view shown the food holder 200 with coupler 30 having clips C, D. But in other embodiments, clips E may alternatively be used, or other types of clips.

Figure 24:
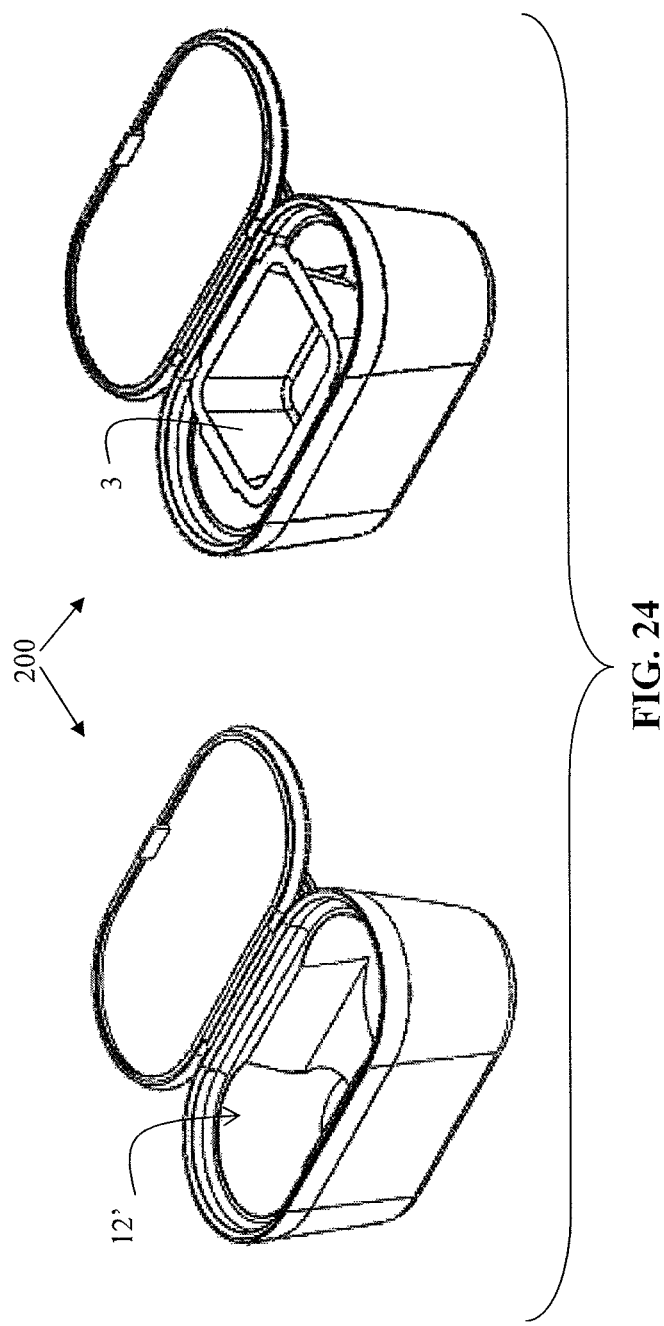
FIG. 24 includes two perspective views of a double-cup vehicle food holder, in accordance with the present invention.

FIG. 24 includes two perspective views of a double-cup vehicle food holder 200, in accordance with the present invention. In one view, the divider 202 is omitted, creating a wider compartment that can be used as two cups or one larger cup. In such embodiments, divider 202 may be removable, to form a food holder with a reconfigurable internal compartment. In FIG. 24, a food storage container 3 can be inserted into the wider compartment to accommodate various sauce containers or other food items (e.g. French fries).

Figure 25:
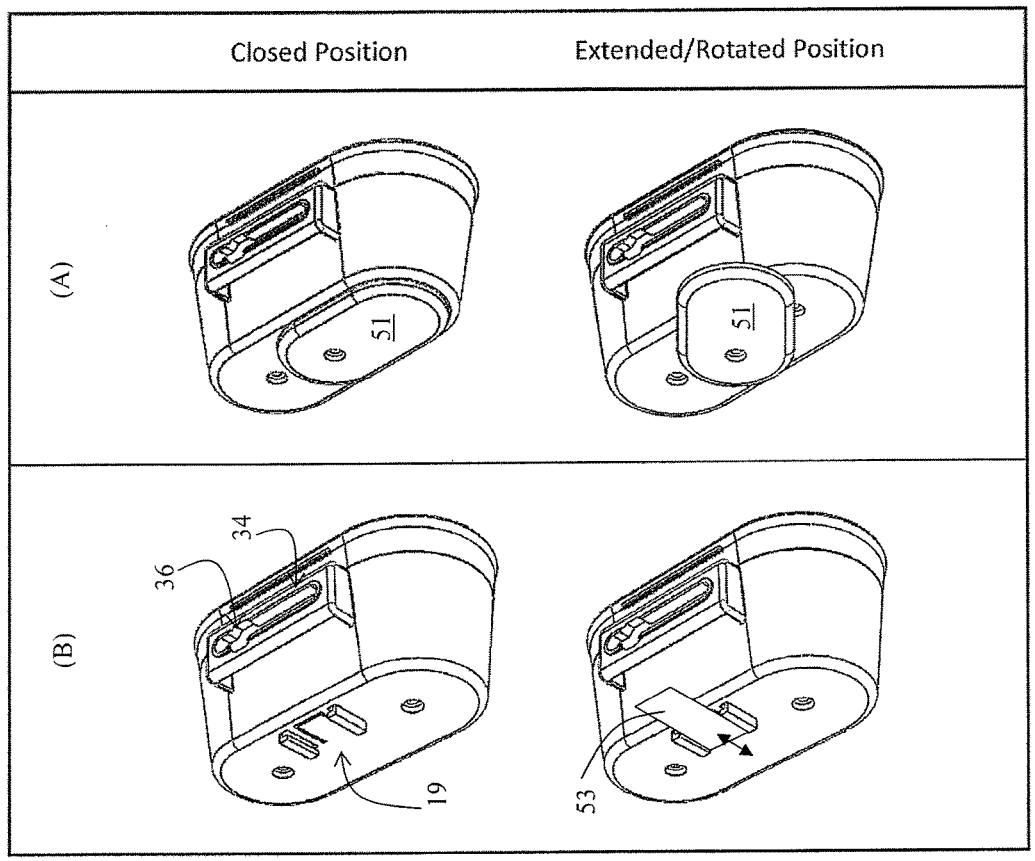
FIG. 25 shows various embodiments of detent mechanisms of the vehicle food holder, in accordance with the present invention.

FIG. 25 shows various embodiments of detent mechanisms 50 of the vehicle food holder 200, in accordance with the present invention. The detent mechanisms 50 shown in FIG. 25 row (A) and row (B) are similar to those of FIG. 16 rows (A) and (C). In row (A) of FIG. 25, a disk 51 is rotatable with respect to a bottom of cup 10, as discussed above. In row (B), the arm 53 can slide within channel 19 formed at the bottom of cup 10. Similarly, the detent mechanism 50 of row (C) of FIG. 16 could be adapted to the double-cup embodiments of the food holder 200.

FIGS. 26-32 show various embodiments of accessories and adaptations for a vehicle food holder 100, 200, in accordance with aspects of the present invention.

In FIG. 26 a sauce container holder 300, such as those used for rectangular barbeque sauce packets 3 given in fast food restaurants, is provided. Sauce container holder 300 includes a rim 302 attached to a coupler 30. Here a clip G, such as the shown in FIG. 11, is depicted, but any of the couplers could be used.

In FIG. 27, a disposable or single use food holder 310 is shown for such barbeque sauces, and the like. In this embodiment, food holder 310 can include a prepackaged sauce.

In FIG. 28, a food holder 320 is provided that include a ring 321 and a cup 10. Food holder 320 can be an insert for a vehicle cup holder and serve the same purpose as those food holder described above.

Figure 29:
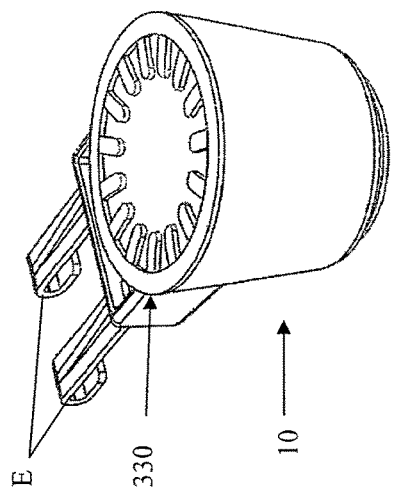

In FIG. 29, a flexible ring insert 330 can be an accessory to a food holder 100, 200. The flexible ring, e.g., made from rubber, can allow the food holder 100, 200 to accommodate different size sauce cups, for example.

Figure 30:
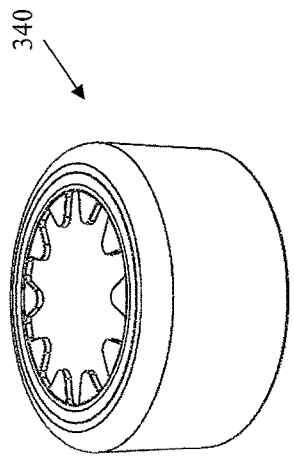

In FIG. 30, a food holder 340 is provided that is similar to that of FIG. 29, which can be an insert for a vehicle cup holder and serve the same purpose as those food holder described above.

Figure 31:
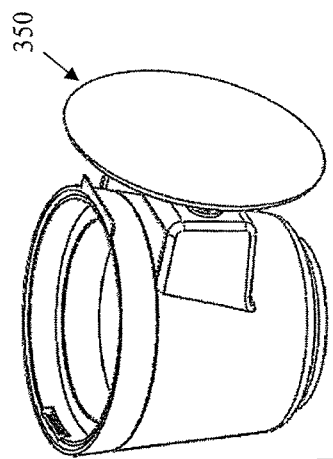

In FIG. 31, the food holder includes a coupler 30 in the form of a suction cup 350 that can be used to couple the food cup holder to windows or other substantially smooth and flat surfaces.

Figure 32:
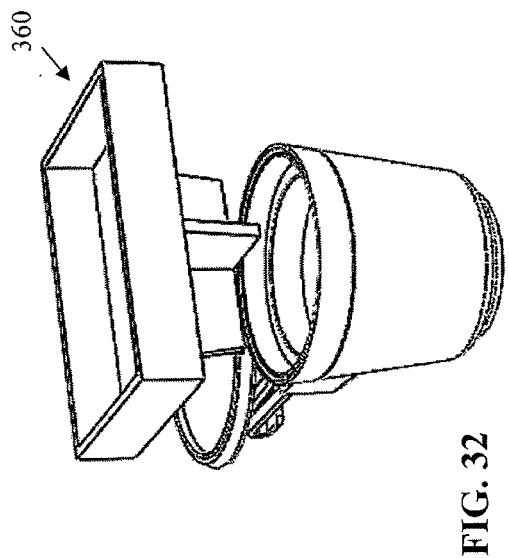

In FIG. 32, a secondary insert 360 can be provided as an accessory for the food holder 100, 200. Insert 360 can provide a different form of holder that could better accommodate certain foods or sauces, as examples.

In various embodiments, any of the couplers could be used with any type of food holder 100, 200. And any of the detents 50 could be used with any type of food holder 100, 200. Also, in various double-cup embodiments with lids, the lid could comprise two separate lids, one for each cup.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A vehicle food holder, comprising:
   at least one cup that is leak-proof, having a first form that includes a top rim, a closed bottom, and closed sides that extend from the top rim to the closed bottom to define a first volume configured to hold a sauce; and
   a coupler configured to couple the at least one cup to an internal part of a vehicle, wherein the coupler comprises at least one clip extending from the top rim and configured to couple the at least one cup to at least one fin in an internal vehicle vent.

2. The food holder of claim 1, wherein the at least one clip has an extended J-hook end, the J-hook end including a U-shaped portion having a return, the U-shaped portion including two substantially parallel segments joined by a curved segment.

3. The food holder of claim 1, wherein the at least one clip includes a plurality of clips, and at least one of the plurality of clips includes at least one clip having an extended J-hook end.

4. The food holder of claim 3, wherein the coupler includes 2 clips, each having an extended J-hook end.

5. The food holder of claim 1, wherein the at least one clip is a plurality of clips, including one or more clips configured to rotate with respect to the at least one cup.

6. The food holder of claim 1, wherein the at least one clip is a plurality of clips, including one or more individually removable clips.

7. The food holder of claim 1, wherein the at least one cup is thermally insulated.

8. The food holder of claim 1, wherein the at least one cup includes an inner shell disposed in an outer shell.

9. The food holder of claim 1, wherein the at least one cup consists of a single cup.

10. The food holder of claim 1, wherein the cup includes a double cup.

11. The food holder of claim 1, further comprising:
    an outwardly extendable detent configured to maintain a distance between the at least one cup and an object to which the food holder is coupled.

12. The food holder of claim 11, wherein the detent extends in a direction of the coupler.

13. The food holder of claim 11, wherein the detent is extendable from a bottom of the at least one cup.

14. The food holder of claim 1, further comprising:
    an insert configured to adapt the at least one cup to a second form defining a second volume different from the first volume.

15. The vehicle food holder of claim 1, further comprising:
    a substantially vertical recess foramed inside the at least one cup.

16. A vehicle food holder, comprising:
    at least one cup configured to hold a fluid food item, wherein the at least one cup includes:
       a top rim, a closed bottom, and closed sides that extend from the top rim to the closed bottom to define a leak-proof volume, and
       an inner shell disposed in an outer shell and the inner shell is removably secured in the outer shell; and
    a coupler configured to couple the at least one cup to an internal part of a vehicle, wherein the coupler comprises at least one clip extending from the top rim.

17. The food holder of claim 16, wherein the inner shell is removably secured in the outer shell by an annular snap and the annular snap comprises an indent defined in the outer shell and a corresponding projection formed on an external surface of inner shell.

18. A vehicle food holder comprising:
- at least one cup configured to hold a fluid food item, wherein the at least one cup includes a top rim, a closed bottom, and closed sides that extend from the top rim to the closed bottom to define a leak-proof volume;
- a coupler configured to couple the at least one cup to an internal part of a vehicle, wherein the coupler comprises at least one clip extending from the top rim, and
- a removable divider configured to divide the at least one cup into at least two separate cups.

19. A vehicle food holder, comprising:
- at least one leak-proof cup having a top rim, a closed bottom, and closed sides that extend from the top rim to the closed bottom defining an internal void configured to hold a fluid food item;
- a coupler configured to couple the at least one cup to an internal part of a vehicle, wherein the coupler comprises at least one clip extending from the top rim and configured to couple the at least one cup to at least one fin in an internal vehicle vent; and
- a lid configured to close the at least one cup.

20. The food holder of claim 19, further comprising:
- an insert configured to adapt the at least one cup to a second form defining a second volume different from the first volume.

* * * * *